US007904102B2

(12) United States Patent
Itaba et al.

(10) Patent No.: US 7,904,102 B2
(45) Date of Patent: Mar. 8, 2011

(54) MOBILE COMMUNICATION SYSTEM AND CONTROL METHOD THEREOF AND RADIO NETWORK CONTROLLER AND BASE STATION USED FOR THE SAME

(75) Inventors: Naoto Itaba, Tokyo (JP); Yoshimasa Imamura, Yokohama (JP); Mayu Yamada, Mitaka (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 10/920,665

(22) Filed: Aug. 18, 2004

(65) Prior Publication Data

US 2005/0181818 A1      Aug. 18, 2005

(30) Foreign Application Priority Data

Feb. 18, 2004      (JP) .................................. 2004-040716

(51) Int. Cl.
*H04B 7/00*          (2006.01)
(52) U.S. Cl. ......... 455/515; 455/450; 455/451; 455/517; 370/342; 370/441; 370/524
(58) Field of Classification Search .................. 455/450, 455/451, 452.1, 452.2, 515–517, 464, 509; 370/352, 247, 251, 253, 524, 329, 335, 341, 370/342, 441
See application file for complete search history.

(56) References Cited

U.S. PATENT DOCUMENTS

| 6,507,567 | B1 * | 1/2003 | Willars ........................... 370/321 |
| 6,804,214 | B1 * | 10/2004 | Lundh et al. ................... 370/335 |
| 6,970,438 | B2 * | 11/2005 | Mate et al. ..................... 370/329 |
| 6,999,471 | B1 * | 2/2006 | Frazer et al. ................... 370/468 |
| 7,184,447 | B1 * | 2/2007 | Koo et al. ....................... 370/441 |
| 7,415,040 | B1 * | 8/2008 | Hwang et al. .................. 370/469 |
| 2002/0075838 | A1 * | 6/2002 | Choi et al. ..................... 370/342 |

(Continued)

FOREIGN PATENT DOCUMENTS

JP          2001-186550          7/2001

(Continued)

OTHER PUBLICATIONS

Japanese Official Action dated Jan. 12, 2010 together with English translation.

(Continued)

*Primary Examiner* — Duc Nguyen
*Assistant Examiner* — Dominic E Rego
(74) *Attorney, Agent, or Firm* — Scully, Scott, Murphy & Presser, P.C.

(57) ABSTRACT

In a mobile communication system, the information on a downlink DCH actually not used is regarded as removable from the construction target of a TFI and a TFCI, so that a discrepancy of the perception regarding the TFI and the TFCI is not occurred between a base station and a UE (User Equipment). An indicator information in terms of an "Unidirectional DCH Indicator" is generated in an Indicator processing portion of a RNC so that the base station can remove the information regarding the downlink DCH actually not used from the construction target of the TFI and the TFCI, and the information, which is included in the NBAP message, is transmitted to the base station from the NBAP message composition portion. When, at the NBAP message analyzing portion of the base station, it is determined that the "Unidirectional DCH Indicator" is included in this message, the information regarding the downlink DCH actually not used in a TFCI construction portion is removed from the construction target of the TFI and the TFCI.

12 Claims, 3 Drawing Sheets

U.S. PATENT DOCUMENTS

| | | | |
|---|---|---|---|
| 2003/0161343 A1* | 8/2003 | Ghosh | 370/465 |
| 2003/0169707 A1* | 9/2003 | Usuda et al. | 370/334 |
| 2004/0014482 A1* | 1/2004 | Kwak et al. | 455/522 |
| 2004/0023693 A1* | 2/2004 | Okawa et al. | 455/562.1 |
| 2004/0097253 A1* | 5/2004 | Malkamaki | 455/522 |
| 2004/0114574 A1* | 6/2004 | Zeira et al. | 370/352 |
| 2004/0116146 A1* | 6/2004 | Sadowsky et al. | 455/525 |
| 2004/0127244 A1* | 7/2004 | Matsumoto et al. | 455/517 |
| 2004/0160959 A1* | 8/2004 | Balachandran et al. | 370/395.4 |
| 2004/0218545 A1* | 11/2004 | Pedersen | 370/252 |
| 2004/0248606 A1* | 12/2004 | Suzuki et al. | 455/522 |
| 2005/0032551 A1* | 2/2005 | Lee et al. | 455/560 |
| 2005/0094656 A1* | 5/2005 | Rao et al. | 370/431 |
| 2005/0239467 A1* | 10/2005 | Nishio | 455/442 |
| 2006/0092973 A1* | 5/2006 | Petrovic et al. | 370/469 |
| 2006/0189334 A1* | 8/2006 | Wakabayashi | 455/500 |
| 2006/0217074 A1* | 9/2006 | Wakabayashi | 455/68 |

FOREIGN PATENT DOCUMENTS

| | | |
|---|---|---|
| JP | 2001-275152 | 10/2001 |
| JP | 2003-188818 | 7/2003 |
| JP | 2003-521182 | 7/2003 |
| WO | WO 03/077587 A1 | 9/2003 |

OTHER PUBLICATIONS

"Change Requests", R3-031216; 3GPP TSG Meeting in Budapest Hungary, dated Aug. 25-29, 2003.

"Change Requests", R3-031217; 3GPP TSG Meeting in Budapest, Hungary, dated Aug. 25-29, 2003.

"Change Requests", R3-030218; 3GPP TSG Meeting in Budapest, Hungary, dated Aug. 25-29, 2003.

"Change Request" , TS25.423 V5.7.0 (Sep. 2003); p. 35-45, p. 251, p. 257-258, p. 287; 3GPP TSG Meeting in Budapest, Hungary, dated Aug. 25-29, 2003.

"Change Request"TS25.433 V5.6.0 (Sep. 2003); 59-66, p. 289, p. 293-294, p. 320-321' 3GPP TSG Meeting in Budapest, Hungary, dated Aug. 25-29, 2003.

"Change Request"TS25.427 V5.2.0 (Sep. 2003); p. 10; 3GPP TSG Meeting in Budapest, Hungary, dated Aug. 25-29, 2003.

* cited by examiner

MOBILE COMMUNICATION SYSTEM AND CONTROL METHOD THEREOF AND RADIO NETWORK CONTROLLER AND BASE STATION USED FOR THE SAME

BACKGROUND OF THE INVENTION

1. Field of the Invention

The present invention relates to a mobile communication system and a control method thereof and a radio network controller and a base station used for the same, and more in particular, it relates to a setting up control system of a unidirectional dedicated channel between the radio network controller and the base station.

2. Description of the Prior Art

In recent years, in a 3GPP (Third Generation Partnership Project), a high speed downlink packet transmission technology has been standardized. This technology is referred to as HSDPA (High Speed Downlink Packet Access), and the channel used in this technology is referred to as a HS-DSCH (High Speed Downlink Shared Channel).

According to the specification of the present 3GPP, there exists a mechanism, wherein dedicated channels are set up in a pair for the uplink and the downlink in the section between a network and a mobile communication terminal (referred to as UE: User Equipment), and RLC AM (Radio Link Control Acknowledged Mode) is executed between the network and the UE. The dedicated channel for the UE is referred to as a DCH (Dedicated Channel) (cf., Japanese Patent Laid-Open No. 2001-186550).

According to the RLC AM, for example, when the UE correctly receives a downlink data, the UE notifies to the network that the data is correctly received by using the uplink channel set up in a pair with the downlink channel, and when the UE does not correctly receive the downlink data, the UE notifies to the network that the data is not correctly received by using the uplink channel. In the later case, the network re-transmits the data not correctly received by the UE.

As shown in FIG. 3, the network comprises a CN (Core Network) 1, an RNC (Radio Network Controller) 2, and a Node B (Radio Base Station) 3, and the RNC 2 has an AM unit 201, which is a function to realize the above described RLC AM, and an UE 4 has also an AM unit 401 corresponding to the AM unit 201. As described above, in the 3GPP, this AM is referred to as the RLC AM.

When the high speed packet transmission channel (HS-DSCH) is set up in a downlink (DL), and moreover, the RLC AM is used, it is necessary to set up an uplink (UL) DCH to be a pair with the HS-DSCH. To set up the HS-DSCH, it is necessary that the UE 4 transitions into a RRC (Radio Resource Control) state, referred to as a Cell-DCH, and in the state of the Cell-DCH, the DCH is set up as a channel for a communication line.

BRIEF SUMMARY OF THE INVENTION

According to the network specification (RNSAP/NBAP: Radio Network Subsystem Application Part/Node B Application Part) of the present 3GPP, it is imperative that the uplink and the downlink DCHs are set up in a pair when the DCH is used. Consequently, when a pair of channels with a HS-DSCH for the downlink and a DCH for the uplink are set up, there arise the problems, which will be specifically described below in detail.

The data transferred by each channel on a transport channel between the RNC 2 and the Node B 3 is given an indicator showing an attribute of the data referred to as a TFI (Transport Format Indicator). This indicator is an identifier of the Transport Format, which is given to every Transport Block Set transferred from a MAC (Media Access Control) layer in the RNC 2 to a PHY (Physical) layer in the Node B3 and, for example, shows a data attribute such as a type of error correction code. The data attribute is shown by a TFS (Transport Format Set), and the TFI is the identifier of the TFS.

In the case of a downlink data transmission, an indicator is given to the data transferred to the Node B3 by the RNC 2. Here, as shown in FIG. 4, the data transferred by each channel (DCH #1 to #3) is multiplexed on a time axis, and the TFI of each data is also integrated into one. The integration of each TFI is referred to as a TFCI (Transport Format Combination Indicator), and the UE is enabled to decode and separate the data multiplexed on the time axis by referring to the TFCI.

For this purpose, it is necessary to share a common perception between the Node B and the UE regarding a correspondence between the TFI and TFCI and an actual attribute of the data. These pieces of information on the TFI and TFCI, as shown in FIG. 5, are notified to the Node B3 from the RNC 2 by using RNSAP/NBAP message, and to the UE 4 from a RRC (Radio Resource Control: not shown particularly) within the RNC, respectively.

In the RRC within this RNC, though it is possible to set up a pair of channels with the HS-DSCH for the downlink and the DCH for the uplink, in the case of RNSAP/NBAP, as described above, it is imperative that the uplink and the downlink are set up in a pair when the DCH is used. Consequently, when the information on the TFI and the TFCI is notified to the Node B, the information on the DCH of the downlink actually not used is also notified, which creates a discrepancy of the perception between the Node B and the UE regarding the TFI and the TFCI. As a result, there arises a problem in that the UE is unable to correctly decode the received data.

The object of the present invention is to provide a radio communication system and a communication method thereof, in which the information on a downlink DCH actually not used is regarded as removable from the construction target of a TFI and a TFCI at the Node B, so that no discrepancy of the perception is occurred between the Node B and the UE.

The mobile communication system according to the present invention is characterized by being a mobile communication system including an user equipment, a base station, and a radio network controller, wherein, the system comprises notifying means for notifying the base station of setting up an unidirectional dedicated channel when the radio network controller sets up the unidirectional dedicated channel with the user equipment.

The communication control method according to the present invention is characterized by being a communication control method in the mobile communication system including an user equipment, a base station, and a radio network controller, wherein the method comprises a step of notifying the base station of setting up an unidirectional dedicated channel when the radio network controller sets up the unidirectional dedicated channel with the user equipment.

The radio network controller of the present invention is characterized by being a radio network controller for controlling a radio network between an user equipment and a base station, wherein said radio network controller comprises notifying means for notifying, the base station of setting up an unidirectional dedicated channel when the unidirectional dedicated channel is set up with the user equipment.

The base station according to the present invention is characterized by being a base station set up between an user equipment and a radio network controller, wherein the base station comprises means for ignoring the information regarding the dedicated channel in opposition to the unidirection in response to a notification of setting up the unidirectional dedicated channel when the radio network controller sets up the unidirectional dedicated channel with the user equipment.

The operation of the present invention will be described. When the RNC sets up a unidirectional DCH with the UE, the Node B can remove the information regarding a counter directional DCH actually not used from the construction target of the TFI and the TFCI, and the Node B is notified so from the RNC. Consequently, to be more precise, the indicator information in terms of "unidirectional DCH indicator" is transmitted from the RNC, and when this indicator information is received at the Node B and its value is set to "Uplink DCH only", the information regarding the downlink DCH actually not used is removed from the construction targets of the TFI and the TFCI.

DETAILED DESCRIPTION OF THE PREFERRED EMBODIMENTS

Figure 1:
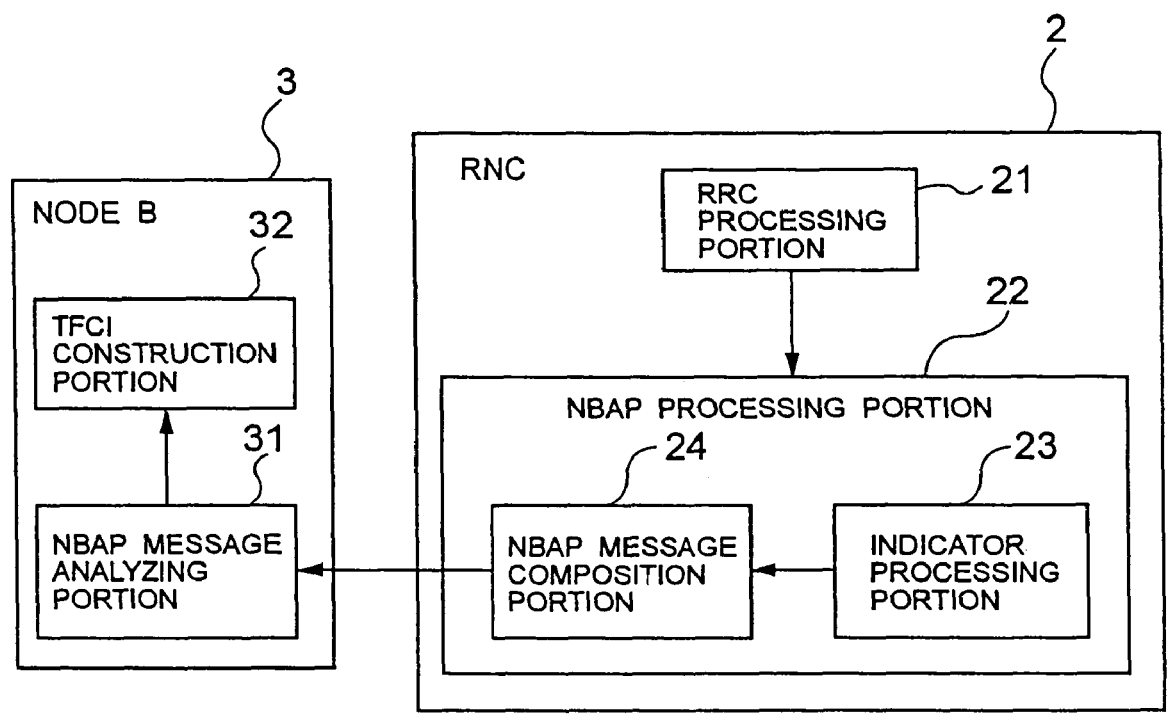
FIG. 1 is a functional block diagram of an embodiment of the present invention.
Figure 3:
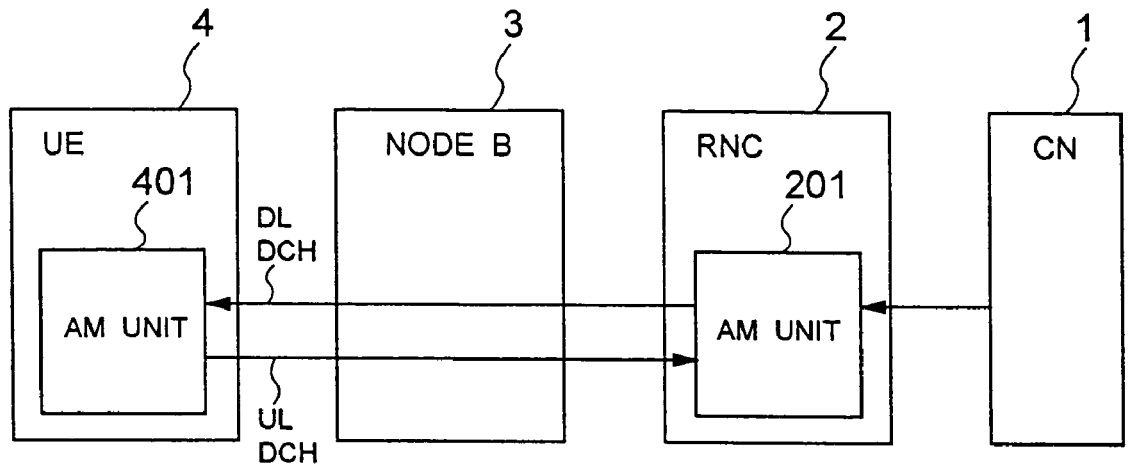
FIG. 3 is a system block diagram to which the present invention is applied.
Figure 4:
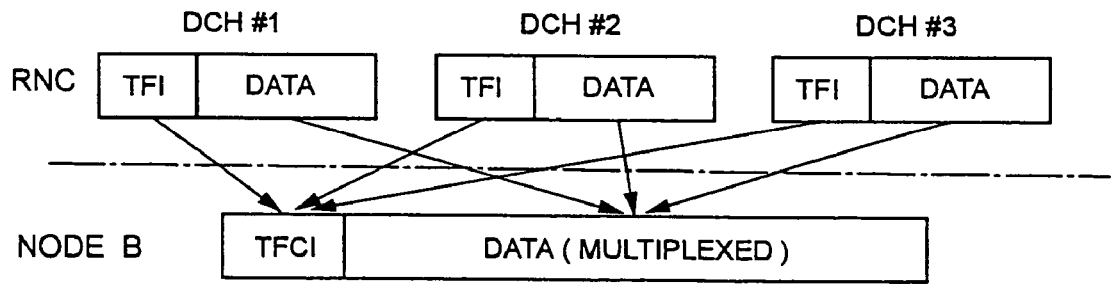
FIG. 4 is an explanatory drawing to explain about a data multiplex state of a plurality of DCHs in the case of a downlink data transfer on a transport channel between a RNC and a Node B.
Figure 5:
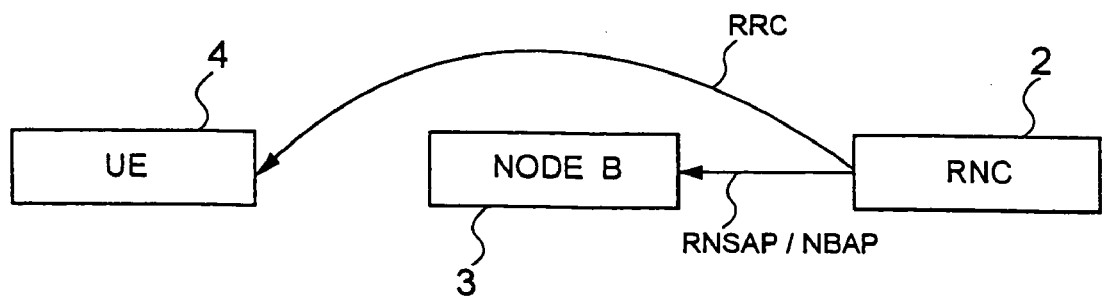
FIG. 5 is a view to explain about a notifying method from a TFI and a TFCI shown in FIG. 4 to the Node B and a UE.

An embodiment of the present invention will be described below with reference to the drawings. FIG. 1 is a functional block diagram of the embodiment of the present invention, and a system block diagram applied for the present invention is the same as that of FIG. 3. In FIG. 1, the same components as those of FIG. 3 are shown by the same reference numerals. In the present example, an RNC 2 and a Node B3 are shown, and the RNC 2 includes a RRC processing portion 21 and a NBAP processing portion 22.

The RRC processing portion 21 processes a protocol between the RNC 2 and a UE which is a mobile communication terminal, and controls a connection between the RNC 2 and the UE. The NBAP processing portion 22 processes a protocol between the RNC 2 and the Node B3, and controls a connection between the RNC 2 and the Node B3.

As described above, though it is possible to set up a pair of channels in terms of the HS-DSCH for the downlink and the DCH for the uplink in the RRC processing portion 21, since it is imperative that the uplink and the downlink are set up in a pair when the DCH is used in the NBAP processing portion 22, when the information on the TFI and TFCI is notified to the Node B3 from the RNC 2 by a NBAP message, the information regarding the downlink DCH actually not used is also notified, thereby occurring the above described problem.

Hence, in the present invention, an indicator information in terms of "unidirectional DCH indicator" is transmitted from the NBAP processing portion 22 of the RNC to the Node B3, and when this indicator information is received at the Node B3 and its value is set to "Uplink DCH only", the information regarding the downlink DCH actually not used is removed from the construction targets of the TFI and the TFCI.

Consequently, as shown in FIG. 1, the NBAP processing portion 22 of the RNC 2 has an indicator processing portion 23 for generating the above described indicator information, and a NBAP message composition portion 24 for transmitting this indicator information to the Node B3 by laying it on the NBAP message. The Node B3 has a NBAP message analyzing portion 31 for receiving and analyzing this NBAP message, and a TFCI construction portion 32 for constructing the TFI and the TFCI by removing the information regarding the down link DCH when the indicator information is detected.

Figure 2:
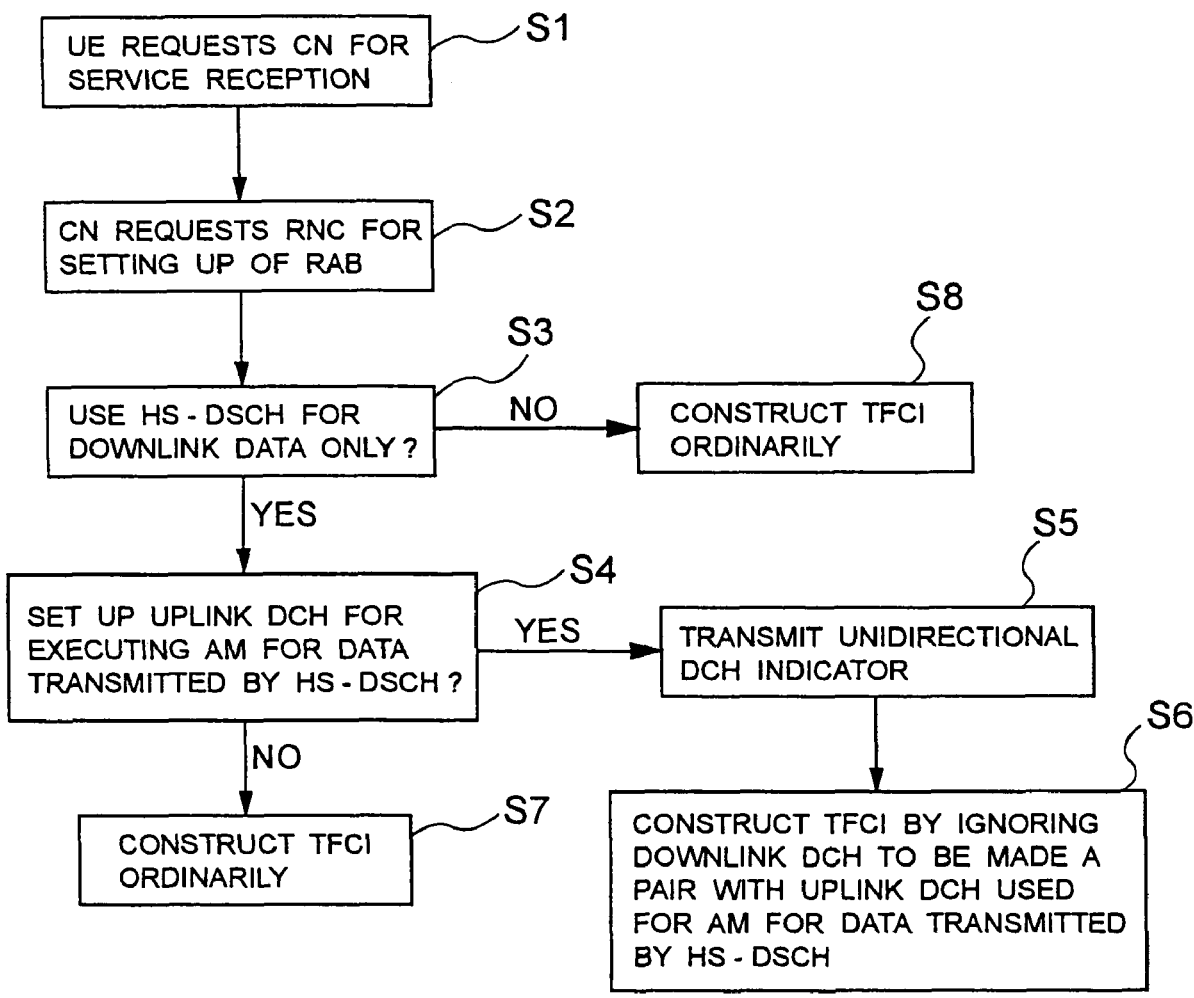
FIG. 2 is a flowchart showing a whole operation of the embodiment of the present invention.

FIG. 2 is a flowchart showing the operation of the embodiment of the present invention. In FIG. 2, when the UE4 requests the CN 1, which is a core network, for a service reception (step S1), the CN 1 requests the RNC 2 to set up a RAB (Radio Access Bearer) for transferring a service data between the CN 1 and the RNC 2 (step S2). When the setting up of the RAB is executed, the indicator processing portion 23 in the NBAP processing portion 22 of the RNC 2 executes the following processing.

First, it is determined whether or not the data reception is the HSDPA service using the HS-DSCH (step S3), and if determined so ("YES" in Step S3), then, it is determined whether or not the setting up of the uplink DCH for executing the AM for the data transmitted by this HS-DSCH is required (step S4).

This determination is a determination whether the AM is required or not, and the determination is made possible by a RNC data set up in advance within the RNC. In this case, the AM for the data transmitted by the HS-DSCH shall not be executed by using the DCH for a control (RRC) uplink or the DCH for data.

When, by the determination of step S4, it is determined that it is necessary to set up the uplink DCH for the AM ("YES" in step S4), an "Unidirectional DCH Indicator" for showing that the downlink DCH is actually not used is generated, and the NBAP message including this "Unidirectional DCH Indicator" is transmitted to the Node B3 from the NBAP message composition portion 24 (step S5).

In the NBAP message analyzing portion 31 of the Node B3 which receives the NBAP message including this "Unidirectional DCH Indicator", the message is analyzed, and it is determined that the message includes the "Unidirectional DCH Indicator", and the TFCI construction portion 32 is notified to that effect. In this TFCI construction portion 32, the information of the downlink DCH made a pair with the uplink DCH used for the AM for the data transmitted by the HS-DSCH is ignored, thereby constructing the TFCI (step S6).

In steps S4 and S5, if the determination is "NO", the TFCI is constructed by the ordinary operation in the TFCI construction portion 32 of the Node B3 (steps S7 and S8). That is, the information on a pair of DCHs of the uplink and downlink is taken into consideration, and the TFCI is constructed.

In the above-described embodiment, though the case of the setting up the HS-DSCH is described, in general, in the case of the service requiring the downlink dedicated channel including the HS-DSCH, the present invention can be widely applied, and moreover, not being limited to the downlink, but also in the case of the service requiring the uplink dedicated channel, the present invention can be applied at a such time as when the information of the uplink DCH is removed from the construction of the TFI and the TFCI. For example, in the 3GPP, the uplink dedicated shared channel referred to as a USCH (Uplink Shared Channel) is defined, and the present invention can be also applied when this USCH is set up.

Further, in the above-described embodiment, though the setting up of the HS-DSCH is described in order to execute the downlink data reception, in the case where the downlink HS-DSCH is set up, and the unidirectional DCH is set up for the uplink direction in order to execute the data transmission and reception of both the uplink and the downlink directions, the present invention can be similarly applied. In this case, where the AM for the data transmitted by the HS-DSCH is not executed, that is, even in the case where an UM (Unacknowledged Mode) is used, the present invention can be applied.

According to the present invention, since the perception regarding the TFI and TFCI can be matched between the network and the UE, there is an advantage that the UE can correctly decode the received data.

What is claimed is:

1. A mobile communication system including a user equipment, a base station, and a radio network controller, said mobile communication system comprising:
    means for notifying, at said radio network controller, said base station of setting up an uplink dedicated channel when said radio network controller sets up the uplink dedicated channel with the user equipment, the notification being included in a Node B Application Part (NBAP) message;
    means for ignoring, at said base station, the information regarding a downlink HS-DSCH (High Speed Downlink Shared Channel) from construction targets of a Transport Format Indicator (TFI) in case of reception of said notification included in the NBAP message, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

2. The mobile communication system according to claim 1, wherein said uplink dedicated channel is an uplink USCH (Uplink Shared Channel).

3. A mobile communication system including a user equipment, a base station, and a radio network controller, said mobile communication system comprising:
    means for generating, at said radio network controller, a Transport Format Indicator (TFI) for a downlink HS-DSCH (High Speed Downlink Shared Channel);
    means for sending said TFI from said radio network controller to said base station, the TFI being included in a Node B Application Part (NBAP) message; and
    means for ignoring at said base station, the information regarding said downlink HS-DSCH from construction targets of the TFI when an uplink dedicated channel is set up between said radio network controller and the user equipment, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

4. A communication control method in a mobile communication system including a user equipment, a base station, and a radio network controller, said communication control method comprising:
    a step of notifying, at said radio network controller, said base station of setting up an uplink dedicated channel when said radio network controller sets up the uplink dedicated channel with the user equipment, the notification being included in a Node B Application Part (NBAP) message;
    a step of ignoring, at said base station, the information regarding a downlink HS-DSCH (High Speed Downlink Shared Channel) from construction targets of a Transport Format Indicator (TFI) in case of reception of said notification included in the NBAP message, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

5. The communication control method according to claim 4, wherein said uplink dedicated channel is an uplink USCH (uplink Shared Channel).

6. A communication control method in a mobile communication system including a user equipment, a base station, and a radio network controller, said communication control method comprising the steps of:
    generating, at said radio network controller, a Transport Format Indicator (TFI) for a downlink HS-DSCH (High Speed Downlink Shared Channel);
    sending said TFI from said radio network controller to said base station, the TFI being included in a Node B Application Part (NBAP) message; and
    ignoring at said base station, the information regarding said downlink HS-DSCH from construction targets of the TFI when an uplink dedicated channel with said user equipment is set up between the radio network controller and the user equipment, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

7. A radio network controller for controlling at least one radio link between a user equipment and a base station, said radio network controller comprising:
    notifying means for notifying said base station of setting up an uplink dedicated channel when said radio network controller sets up the uplink dedicated channel with the user equipment, the notification being included in a Node B Application Part (NBAP) message, by which the base station ignores the information regarding a downlink HS-DSCH (High Speed Downlink Shared Channel) from construction targets of a Transport Format Indicator (TFI) in case of reception of the notification in the NBAP message, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

8. The radio network controller according to claim 7, wherein said uplink dedicated channel is an uplink USCH (Uplink Shared Channel).

9. A radio network controller for controlling at least one radio link between a user equipment and a base station, said radio network controller comprising:

means for generating a Transport Format Indicator (TFI) for a downlink HS-DSCH (High Speed Downlink Shared Channel);

means for sending said TFI to the base station when an uplink dedicated channel is set up between the RNC and the user equipment, the TFI being included in a Node B Application Part (NBAP) message, wherein the base station ignores the information regarding the downlink HS-DSCH from construction targets of a TFI in case of reception of the NBAP message, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

10. A base station set up between a user equipment and a radio network controller, wherein, when said radio network controller sets up an uplink dedicated channel with said user equipment, said base station comprises:

means for ignoring an information regarding a downlink HS-DSCH (High Speed Downlink Shared Channel) from construction targets of a Transport Format Indicator (TFI) in response to a notification of setting up said uplink dedicated channel, said notification being included a Node B Application Part (NBAP) message when the uplink dedicated channel is set up between the radio network controller and the user equipment, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

11. The base station according to claim 10, further comprising: means for constructing said downlink dedicated channel to be transferred on a transport channel with said radio network controller based on the TFI regarding said downlink dedicated channel.

12. A base station set up between a user equipment and a radio network controller, said base station comprising:

means for receiving from said radio network controller a Transport Format Indicator (TFI) for a downlink HS-DSCH (High Speed Downlink Shared Channel), the TFI being included in a Node B Application Part message; and means for ignoring said downlink HS-DSCH from construction targets of the TFI when an uplink dedicated channel with said user equipment is set up, wherein said uplink dedicated channel is a channel to be made a pair with said downlink HS-DSCH in opposition to said uplink dedicated channel when said radio network controller sets up said uplink dedicated channel with said user equipment, and said downlink HS-DSCH is for a high speed packet transmission service, and said uplink dedicated channel is used for information transmission for an acknowledge mode for data of the service.

\* \* \* \* \*

UNITED STATES PATENT AND TRADEMARK OFFICE
CERTIFICATE OF CORRECTION

| | |
|---|---|
| PATENT NO. | : 7,904,102 B2 |
| APPLICATION NO. | : 10/920665 |
| DATED | : March 8, 2011 |
| INVENTOR(S) | : Naoto Itaba et al. |

It is certified that error appears in the above-identified patent and that said Letters Patent is hereby corrected as shown below:

ON THE TITLE PAGE:

Item (73) Assignee should read: NEC Corporation, Tokyo (JP)
NTT DoCoMo, Inc., Tokyo (JP)

Signed and Sealed this
Second Day of August, 2011

David J. Kappos
*Director of the United States Patent and Trademark Office*